W. L. DAVIS.
FRONT AXLE BRACE.
APPLICATION FILED FEB. 17, 1919.

1,333,902.

Patented Mar. 16, 1920.

Inventor
William L. Davis
By
His Attorneys

UNITED STATES PATENT OFFICE.

WILLIAM L. DAVIS, OF PETERSBURG, VIRGINIA.

FRONT-AXLE BRACE.

1,333,902.  Specification of Letters Patent.  Patented Mar. 16, 1920.

Application filed February 17, 1919. Serial No. 277,464.

*To all whom it may concern:*

Be it known that I, WILLIAM L. DAVIS, a citizen of the United States, residing at Petersburg, in the county of Dinwiddie and State of Virginia, have invented a new and useful Front-Axle Brace, of which the following is a specification.

My invention relates to improvements in vehicle construction particularly applicable to Ford automobiles and has for its principal object the provision of a brace rod which shall relieve the front axle of strains and vibrations thereby rendering the front end of the chassis more firm and stiff and, therefore, less susceptible to the frequent jars commonly received in road service.

A further object is the provision of a rigid positive connection between the center of the front axle and the rear end of the radius rods, whereby vibration of the axle is reduced to a minimum and the jarring loose of the nuts thereon is obviated.

These objects are obtained by means of the structure shown in the accompanying drawings, in which,—

Figure 1:
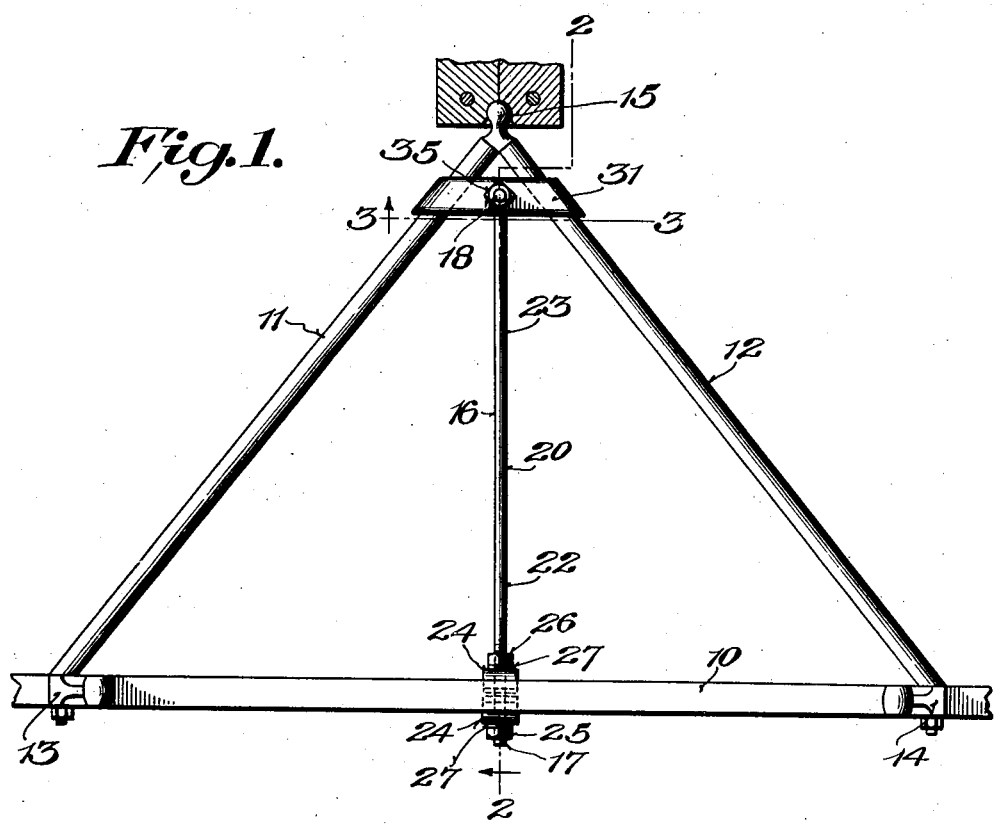
Figure 1 is a plan view of the front axle and radius rods of a Ford car to which my invention has been applied.
Figure 2:
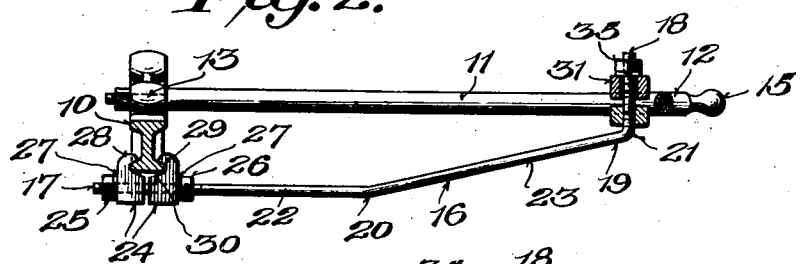
Fig. 2 is a central vertical view through the brace and connected parts.
Figure 3:
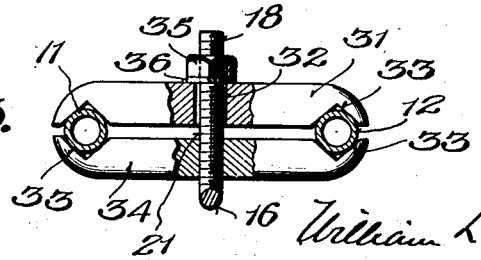
Fig. 3 is a view of the rear clamp.

In the drawings, 10 is the usual I-beam front axle of a Ford car and 11, 12 the radius rods connected thereto as at 13, 14, and merging together in a union or wishbone 15 of standard type.

My improved brace consists of a rod 16 threaded at either end as at 17, 18, and being bent upwardly at nearly a right angle at 19 near one end and being bent slightly out of true as at 20, thereby forming a short vertical section 21 and a horizontal section 22 connected together by the integral sloping portion 23, each of the two threaded sections 21 and 22 performing the combined functions of a clamping bolt and a connection.

A pair of castings 24 identical in shape, are loosely mounted on the threaded end 17 and serve to firmly grip the front axle between them, being held in such engagement by nuts 25 and 26 each preferably having a lock washer 27 between it and the adjacent clamp or casting. These castings have a rectangular body portion, centrally pierced to receive the rod, and an upwardly directed jaw 28, undercut as at 29 to engage the lower flange of the I-beam axle, the latter being guided into the undercut 29 by the sloping side 30.

The upper clamp 31 is of usual construction, centrally pierced as at 32 to slidably receive the threaded section 18, and having V-shaped grooves 33 at the proper angle to clamp the radius rods firmly between it and the lower clamp 34 which is likewise provided with grooves 33 but which is threaded to fit on the section 18, thereby avoiding the use of an additional nut. A nut 35 and lock washer 36 hold the upper clamp in place.

What is claimed is:

1. A front axle support consisting of a rod threaded at one end, a radius rod clamp consisting of two members, one of which is threaded to receive the threaded end of the rod, and a front axle clamp secured to the other end of the rod.

2. A front axle support consisting of a rigid brace rod threaded at either end, a clamp member secured to one end thereof, a second clamp loosely mounted on said rod and adapted to coöperate with the first mentioned clamp to positively engage the rear ends of the radius rods of an automobile, a pair of members loosely mounted on the other end of the rod, each carrying a jaw, and means for holding the jaws in positive engagement with the center of the front axle of said automobile.

WILLIAM L. DAVIS.